United States Patent [19]

Nakayama et al.

[11] Patent Number: 5,193,945
[45] Date of Patent: Mar. 16, 1993

[54] CUTTING TOOL

[75] Inventors: Masaaki Nakayama; Masayuki Okawa; Junichi Saito, all of Ibaraki, Japan

[73] Assignee: Mitsubishi Materials Corporation, Tokyo, Japan

[21] Appl. No.: 840,086

[22] Filed: Feb. 24, 1992

[30] Foreign Application Priority Data

Feb. 25, 1991 [JP] Japan .............................. 3-8879[U]
Feb. 25, 1991 [JP] Japan .............................. 3-8880[U]

[51] Int. Cl.⁵ ............................................. B23B 27/16
[52] U.S. Cl. ........................................ 407/66; 407/8; 407/102
[58] Field of Search ............. 407/119, 40, 47, 102, 407/103, 107, 113, 114, 8, 9

[56] References Cited

U.S. PATENT DOCUMENTS

| 1,713,273 | 5/1929 | Farrington | 407/8 X |
| 2,704,881 | 3/1955 | Barrett | 407/8 |
| 3,800,380 | 4/1974 | Cline et al. | 407/119 X |

FOREIGN PATENT DOCUMENTS

| 53-116090 | 9/1978 | Japan . |
| 54-83085 | 6/1979 | Japan . |
| 60-29004 | 2/1985 | Japan . |
| 60-127803 | 8/1985 | Japan . |
| 2-97504 | 8/1990 | Japan . |
| 671005 | 4/1952 | United Kingdom . |

OTHER PUBLICATIONS

Soviet Patents Abstracts, Derwent, Sec. PQ, Week 8630, & SU A 1,199,468 Dec. 1985 English Abstract.

Primary Examiner—Steven C. Bishop
Attorney, Agent, or Firm—Cushman, Darby & Cushman

[57] ABSTRACT

A cutting tool having a positioning block inserted between the cutting insert and the insert-receiving seat is disclosed. The disclosed cutting tool demonstrates excellent resistance to damage by severe vibration caused by the milling process. The cutting tool of the present invention comprises (a) a tool body having a recess formed at a forward end thereof and defining a insert-receiving seat; (b) a cutting insert; (c) a positioning block to be placed between the cutting insert and said insert-receiving seat, having a top and bottom faces and having a hardness thereof which is lower than that of a surface of an insert-receiving seat; and (d) clamp means for securing the cutting insert and the positioning block on the insert-receiving seat. The above described positioning block is able to absorb some extent of vibration of the cutting insert during the milling process. According to the present invention, there is also provided the cutting tool in which a positioning block has two layers. A hardness of a surface of the insert-receiving seat is higher than that of the first layer but is lower than that of the second layer.

10 Claims, 5 Drawing Sheets

CUTTING TOOL

BACKGROUND OF THE INVENTION

1. Field of the Invention

The present invention relates to cutting tools having a releasable and disposable cutting insert secured to an insert-receiving seat, including milling cutters and the like. Particularly, the present invention relates to a cutting tool having a positioning block between the cutting insert and the insert-receiving seat.

2. Prior Art

There are two basic types of insert-clamped cutting tools provided with the disposable cutting inserts.

For one type of conventional cutting tools, for example, a lever clamping type byte is depicted in FIG. 9. In this figure, the cutting tool comprises a tool body 1 having an insert-receiving seat or recess 2 formed at its forward end. The tool body 1 also has a L-shaped lever 3 provided in a hole opening to the insert-receiving seat 2 and a bolt 4 provided in a hole adjoined to the first hole. In this example, a throwaway cutting insert 6 with a mounting bore 7 formed therethrough is received on the insert receiving seat 2, while the L-shaped lever 3 is received in the first hole so as to protrude its head portion 5 from the seat 2 to engage with the mounting bore 7 of the insert 6 when the end portion of the lever 3 is pushed downwardly by the bolt 4. In this example, a positioning block 8 is provided between the insert 6 and the seat 2.

FIG. 10 depicts another type of the conventional insert-clamped cutting tool which comprises a tool body 10 having an insert receiving seat or recess 11 formed at its forward end and a bolt-receiving hole opening on the insert-receiving seat 11. A positioning block 12 with a bore formed therethrough is provided on the insert receiving seat 11, and a bolt 13 is inserted through the bore to engage the bolt therewith. Furthermore, a throwaway cutting insert 14 is mounted on the positioning block 12 and pressed against the seat 11 by clamping means including a clamp 15 and a clamping bolt 16.

In general, the positioning blocks 8 and 12 are made of materials such as cemented carbide, high speed steel or the like. Accordingly, these conventional blocks are characterized by their hardness which is lower than that of the cutting insert but higher than that of the surface of the seat to avoid wearing the insert down.

However, the conventional positioning block is made of hard material and thus it is difficult to absorb severe vibration of the cutting insert during the milling process. Consequently, the conventional cutting tool using the above described positioning block has some problems i.e., slipping off of the insert from the insert-receiving seat, damaging the cutting edge of the insert, chipping the insert, or the like, caused by the vibration of the cutting insert.

SUMMARY OF THE INVENTION

It is therefore an object of the present invention to reduce or resolve the above described problems and to achieve an increase in reliability of operation by providing a particularly advantageous construction of the positioning block inserted between the cutting insert and the insert-receiving seat.

According to the present invention, there is provided a cutting tool comprising (a) a tool body having a recess formed at a forward end thereof and defining a insert-receiving seat; (b) a cutting insert; (c) a positioning block to be placed between the cutting insert and the insert-receiving seat, having top and bottom faces and having a hardness thereof which is lower than that of a surface of the insert-receiving seat; and (d) clamp means for securing said cutting insert and the positioning block on said insert-receiving seat. The above described positioning block is able to absorb some extent of vibration of the cutting insert during the milling process.

According to the present invention, there is also provided the cutting tool in which a positioning block has two layers. In this case, a hardness of a surface of the insert-receiving seat is higher than that of the first layer but lower than that of the second layer.

BRIEF DESCRIPTION OF THE DRAWINGS

In order that the invention may be readily carried into effect, it will now be described with reference to the accompanying drawings, wherein.

DESCRIPTION OF THE PREFERRED EMBODIMENTS OF THE INVENTION

Figure 1:
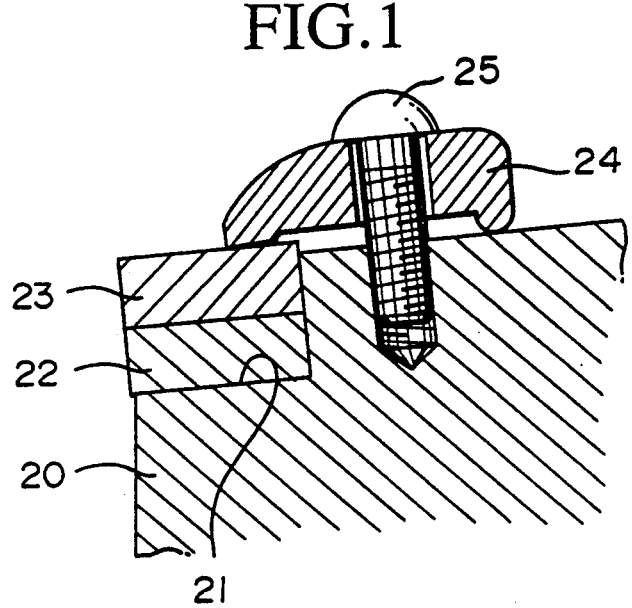
FIG. 1 is a fragmentary cross sectional view of a cutting tool in accordance with the present invention.

Referring to FIG. 1, a first preferred embodiment of the cutting tool in accordance with the present invention comprises a tool body 20 having recess formed at its forward end and defining an insert-receiving seat 21, a throwaway cutting insert 23 which can be fixed on the seat and replaced regularly, a positioning block 22 which is interposed between the insert-receiving seat 21 and the cutting insert 23, and clamp means including a clamp 24 and a bolt 25. In this embodiment, the cutting insert 23 and top and bottom faces of the positioning block 22 have the same shape to each other. In addition, a hardness of the positioning block is lower than that of a surface of the insert-receiving seat for absorbing some extent of vibration of the cutting insert during the milling process.

In the above described cutting tool as illustrated in FIG. 1, the cutting insert 23 is fixed on the insert-receiving seat 22 by clamp means 24 and 25. The clamp 24 is disposed at a position shifted rearward of the tool body 20 relative to the insert-receiving seat 21 and is connected with the tool body 20 via a bolt 25. In the cutting tool described above, when the clamp bolt 25 is tightened, the insert 23 and the positioning block 22 are pressed by the clamp 24 against the insert-receiving seat 21.

Figure 2:
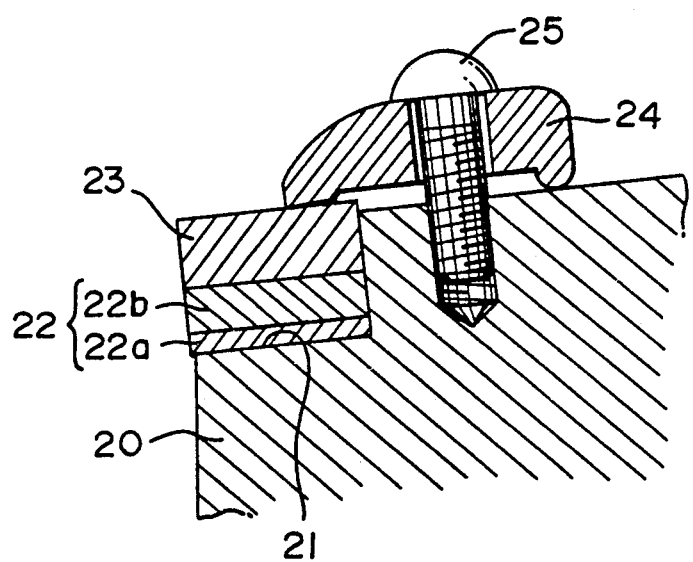
FIG. 2 is a fragmentary cross sectional view of the cutting tool as shown in FIG. 1 except that the positioning block comprises two layer.

FIG. 2 shows a cutting tool of FIG. 1 except that the positioning block 22 comprises two layers i.e., a first layer 22a which is on the side of the insert-receiving seat 21 and a second layer 22b which is on the side of the cutting insert 23. In this embodiment, the first layer 22a is characterized by having a thickness lower than that of the second layer 22b and is made of a soft metal such as copper, aluminum or the like. This first layer 22a is not only responsible for absorbing undersirable vibrations and shocks which act on the cutting insert 23 during the milling operation by its elastic property but also for preventing the wear of the insert-receiving seat 21. On the other hand, the second layer 22b is made of a high-hardness material such as cemented carbide, high speed steel or the like, and is responsible for preventing the wear of the positioning block.

It is noted that a hardness of a surface of the insert-receiving seat 21 is higher than that of the first layer 22a but lower than that of the second layer 22b.

Figure 3:
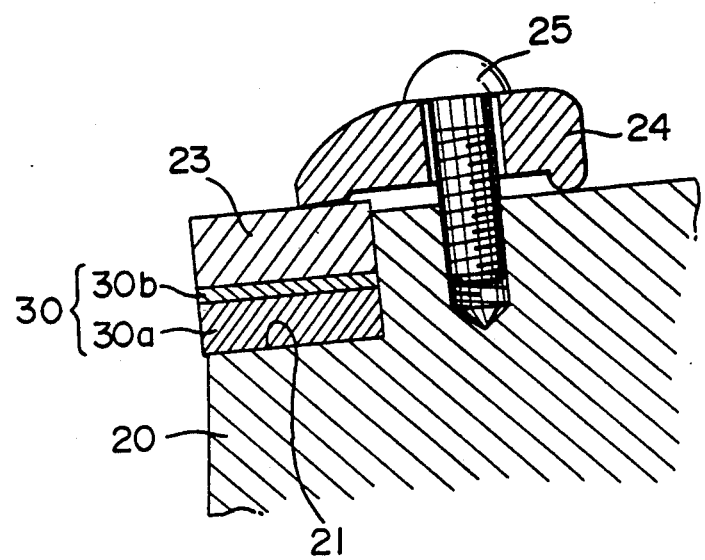
FIG. 3 is a fragmentary cross sectional view of the cutting tool as shown in FIGS. 1 and 2 except that the positioning block has a first layer with a thickness larger than that of a second layer.

FIG. 3 shows the third preferred embodiment of the same invention as illustrated in FIG. 2 except that the positioning block 30 has a first layer 30a with a thickness larger than that of a second layer 30b. Therefore, comparing with the second embodiment of the present invention, severe vibration of the insert 23 can be absorbed more effectively by the positioning block 30 having a thickness of the soft layer 30a which is thicker than that of the hard layer 30b. In the case of the second embodiment of the present invention, on the other hand, in spite of the fact that a shape of the first layer 22a is elastically changed by the vibration during the milling process, a size change of the block 22 is hardly occurred, because a thickness of the soft layer 22a is smaller than that of the hard layer 22b and thus the milling operation can be performed with accuracy.

Figure 4:
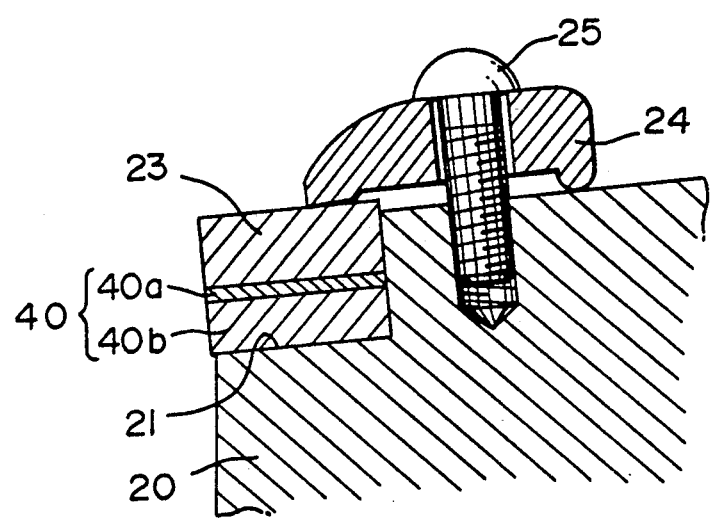
FIG. 4 is a fragmentary cross sectional view of the cutting tool as shown in FIGS. 1-3 except that the positioning block comprises a first layer on the side of the cutting insert.

FIG. 4 shows a fourth preferred embodiment of the same invention as illustrated in FIGS. 1-3 except that the positioning block 40 comprises a first layer 40a which is on the side of the cutting insert 23 and a second layer 40b which is on the side of the insert-receiving seat 21. The first layer 40a is characterized by having a thickness smaller than that of the second layer 40b and is made of a soft metal such as copper, aluminum or the like. On the other hand, the second layer 40b is made of a high-hardness material such as cemented carbide, high speed steel or the like. It is noted that the first layer 40a of the block is easily formed into various shapes by means of pressing thus this layer 40 is also responsible to fit to the shape of the insert to be attached.

Figure 5:
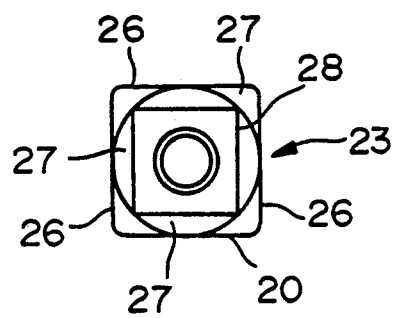
FIG. 5 is a plan view of a cutting insert having grooves on top and bottom faces thereof in accordance with the present invention.
Figure 6:
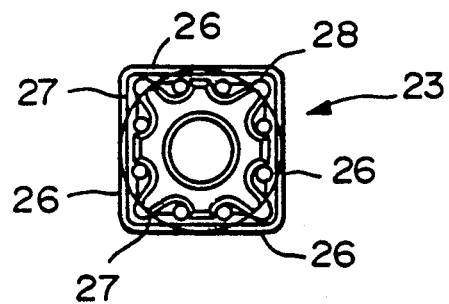
FIG. 6 is a plan view of another cutting insert as shown in FIG. 5 except that the insert has a different pattern of grooves.
Figure 7:
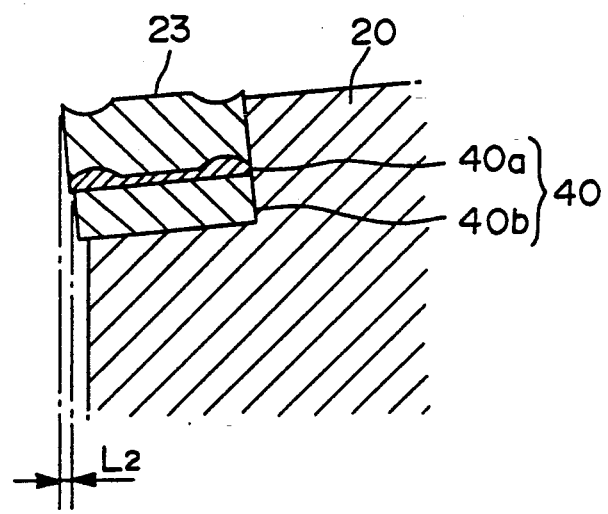
FIG. 7 is a fragmentary cross sectional view of the cutting tool having a cutting insert of FIG. 5 or 6 in accordance with the present invention.

In the cutting tool according to the present invention, the throwaway cutting insert 23 has top and bottom faces in the form of square. As shown in FIGS. 5 and 6, these faces are provided as rake faces where cutting edges 26 are formed on ridge lines thereof. For holding the cutting insert 23 on the insert-receiving seat 22, there are several grooves or notches 27 formed along the cutting edges 26 on the surface. As shown in FIG. 7, the insert 23 can be attached on a surface of the first layer 40b by an attaching portion 28 thereof which is surrounded by the above mentioned grooves 27. When the insert 23 of FIGS. 5 or 6 is pressed by the clamp against the first layer 40a of the positioning block 40, the surface of the first layer 40a can be deformed so as to be fitted to the shape of the bottom face of the insert 23. Consequently, substantial improvement of securing the insert 23 on the seat 21 can be achieved.

Figure 8:
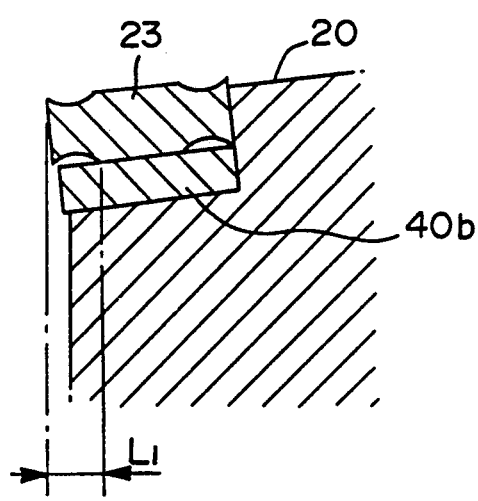
FIG. 8 is a fragmentary cross sectional view of the cutting tool as shown in FIG. 7 except that the positioning insert only has a second layer.
Figure 9:
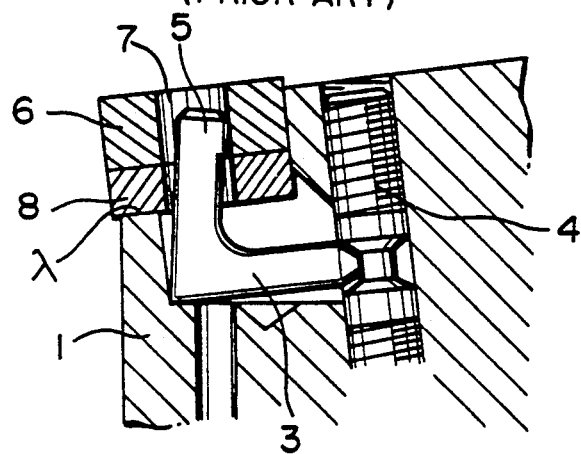
FIG. 9 is a fragmentary cross sectional view of a conventional cutting tool, a lever clamping type bite.
Figure 10:
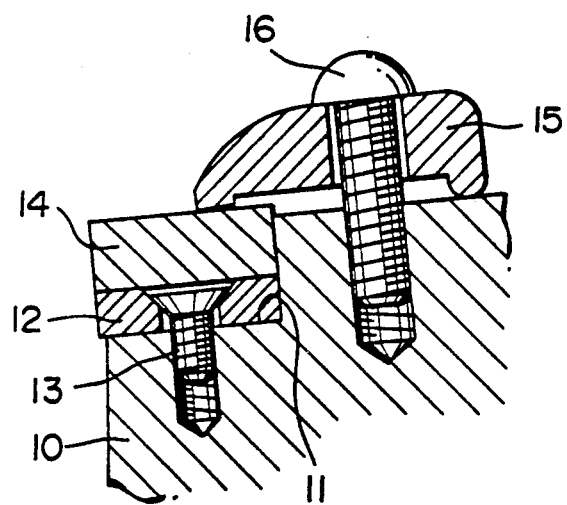
FIG. 10 is a fragmentary cross sectional view of another type of the conventional cutting tool.

Referring to FIG. 8, on the other hand, when the insert 23 of FIGS. 5 or 6 is pressed by the clamp directly against the second layer 40b, some spaced portions between the insert 23 and the second layer 40b remains. Therefore, the distance L1 between a ridge of the top face and a portion coming into contact with a surface of the layer 40b becomes larger than the distance L2 of FIG. 7.

As described above, the cutting tool according to the present invention has a positioning block including two different layers and a surface-modified cutting insert. Hence, the cutting tool of the present invention has the advantage of increasing the reliability of operation. It will be understood that other embodiments and modifications of the invention are contemplated. It is the intention to include all such embodiments and modifications within the scope of the invention as are defined by the appended claims.

What is claimed is:

1. A cutting tool comprising:
   (a) a tool body having a recess formed at a forward end thereof and defining an insert-receiving seat;
   (b) a disposable cutting insert;
   (c) a positioning block comprising a first layer to be placed between said cutting insert and said insert-receiving seat, having top and bottom faces and having a hardness thereof which is lower than a hardness of a surface of said insert-receiving seat and is lower than a hardness of a surface of said cutting insert said positioning block further comprises a second layer, in which a hardness of said second layer is higher than the hardness of the surface of the insert-receiving seat; and
   (d) clamp means for securing said cutting insert and said positioning block on said insert-receiving seat.

2. A cutting tool claimed in claim 1, wherein said first layer is made of a soft metal selected from the group consisting of copper and aluminum.

3. A cutting tool claimed in claim 1, wherein said first layer is made of a soft metal selected from the group consisting of copper and aluminum, said second layer is made of a high-hardness material selected from the group of cemented carbide and high speed steel.

4. A cutting tool claimed in claim 1 or 3, wherein said first layer is in intimate contact with the insert-receiving seat, while said second layer is in intimate contact with the cutting insert.

5. A cutting tool claimed in claim 1 or 3, wherein said first layer is in intimate contact with the cutting insert, while said second layer is in intimate contact with the insert-receiving seat.

6. A cutting tool claimed in claim 5, wherein a surface of said cutting insert contacting with first layer has at least one groove.

7. A cutting tool claimed in claims 4, wherein said first layer is thicker than said second layer.

8. A cutting tool claimed in claim 5, wherein said second layer is thicker than said first layer.

9. A cutting tool claimed in claim 5, wherein said cutting insert having top and bottom faces in the form of square, and said faces are provided as rake faces where cutting edges are formed on ridge lines thereof.

10. A cutting tool as claimed in claim 1, wherein said top and bottom faces of said cutting insert and said top and bottom faces of said positioning block have the same shape.

* * * * *